G. KOENIG.
ADDING MACHINE.
APPLICATION FILED APR. 15, 1911.

1,048,321.

Patented Dec. 24, 1912.

8 SHEETS—SHEET 1.

Witnesses
James F. Mansfield
L. E. Witham.

Inventor
George Koenig
by Alexander & Dowell
Attorneys

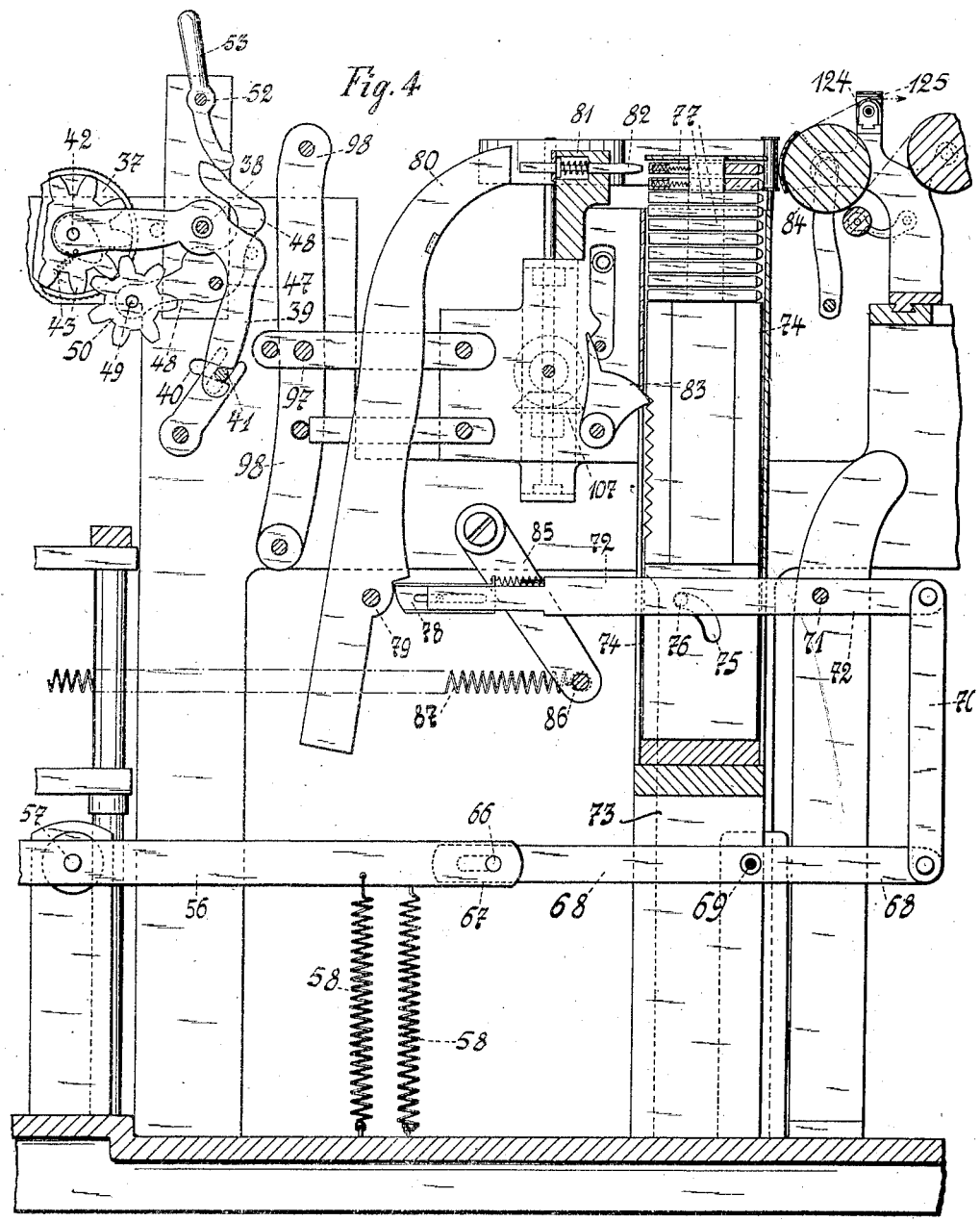

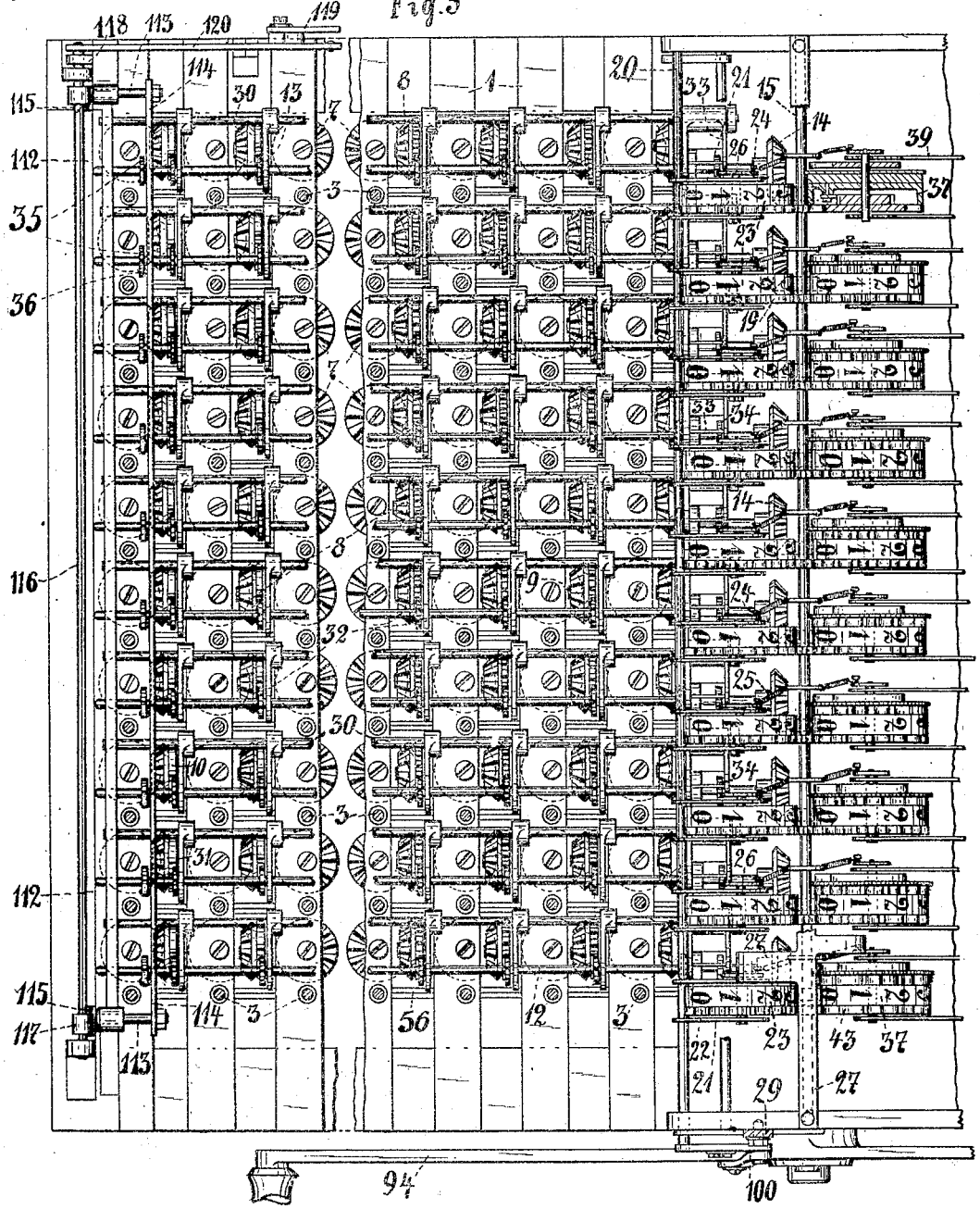

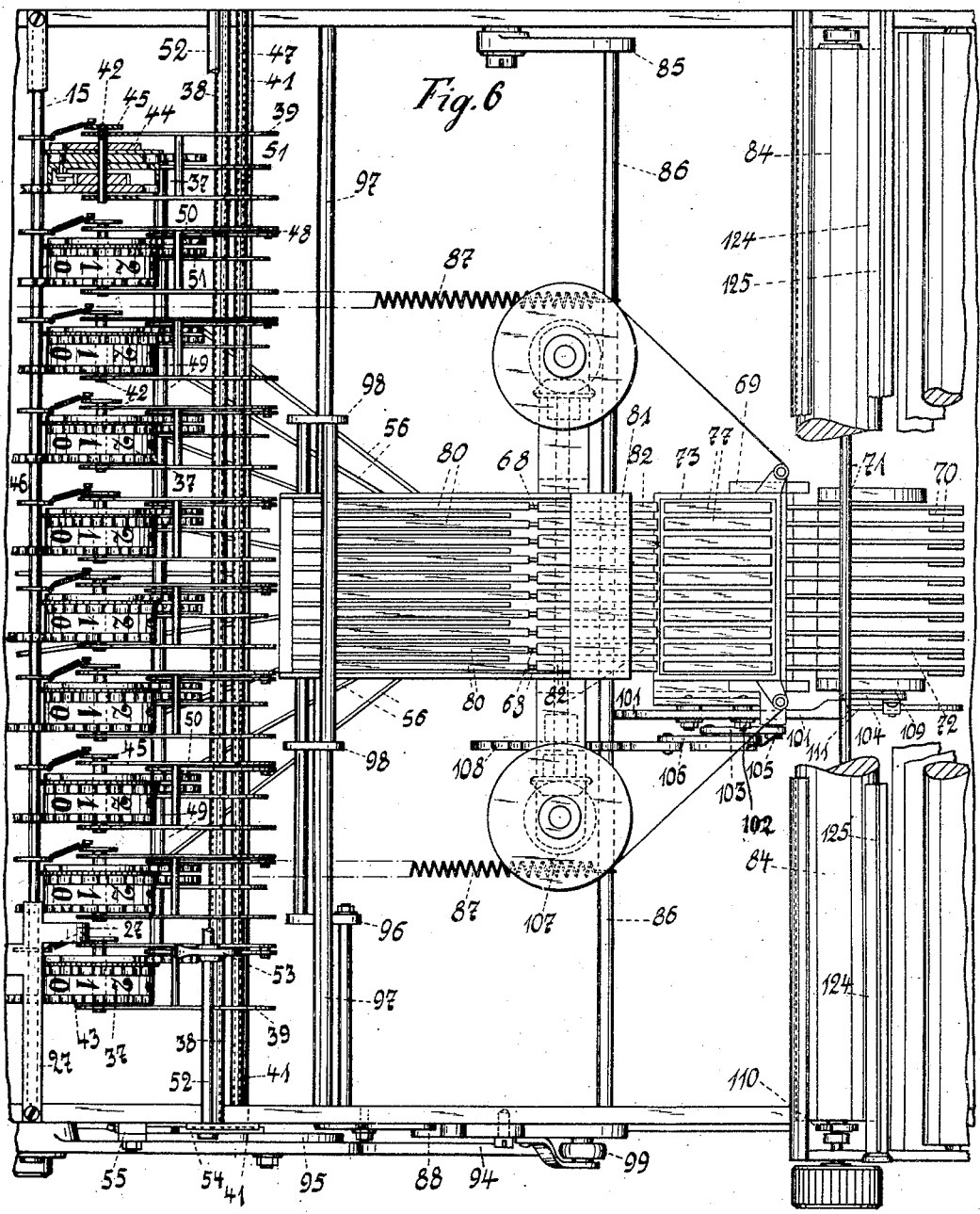

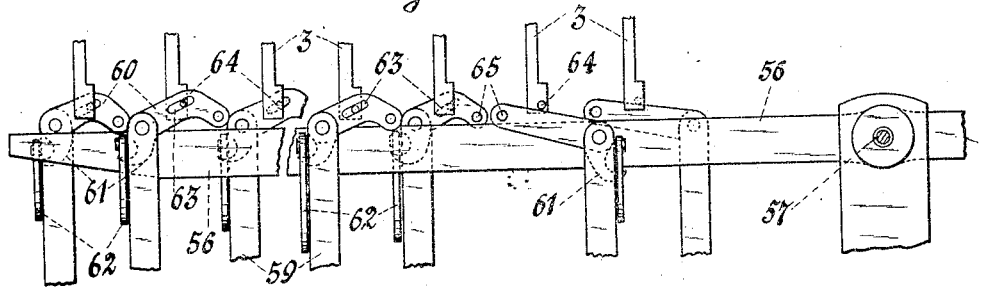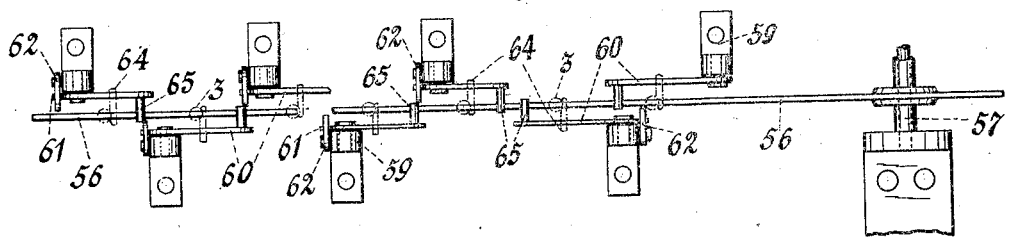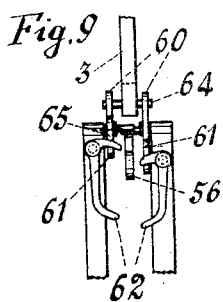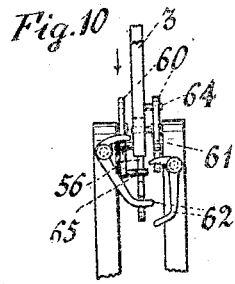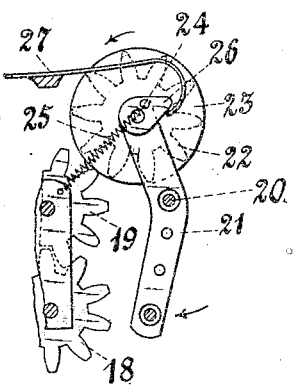

G. KOENIG.
ADDING MACHINE.
APPLICATION FILED APR. 15, 1911.
1,048,321.
Patented Dec. 24, 1912.
8 SHEETS—SHEET 8.
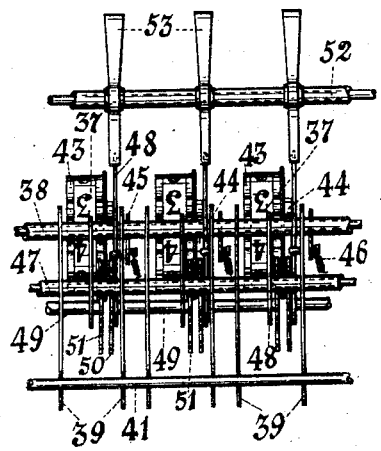
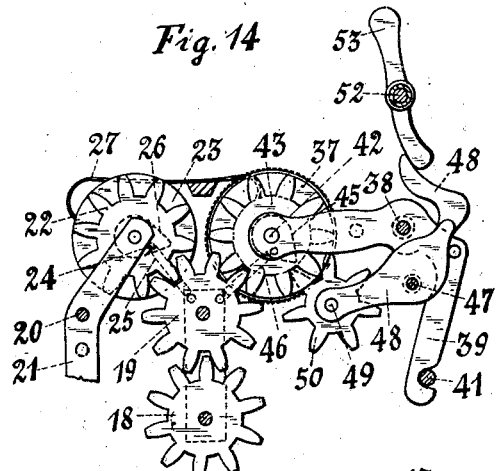
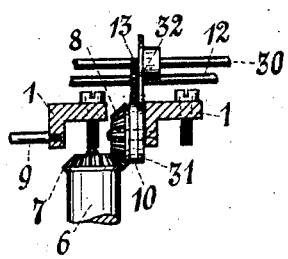
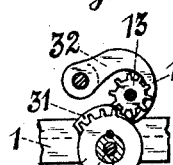
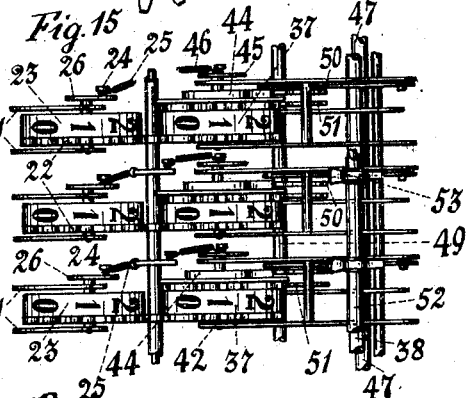
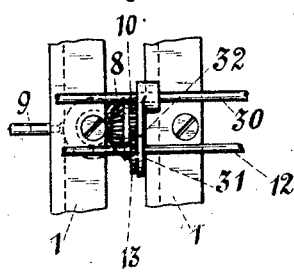
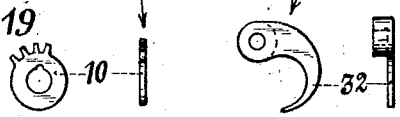
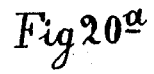
Witnesses
Inventor
George Koenig
by Alexander McDowell
Attorneys

UNITED STATES PATENT OFFICE.

GEORGE KOENIG, OF GAUTZSCH, NEAR LEIPZIG, GERMANY.

ADDING-MACHINE.

1,048,321.  Specification of Letters Patent.  Patented Dec. 24, 1912.

Application filed April 15, 1911. Serial No. 621,263.

*To all whom it may concern:*

Be it known that I, GEORGE KOENIG, a subject of the King of Saxony, residing at Gautzsch, near Leipzig, in Germany, have invented a certain new and useful Improvement in Adding-Machines, of which the following is a specification.

One object of the present invention is to provide certain improvements in the mechanism of adding machines.

Another object is to provide, in combination with the improved adding mechanism, improved mechanism for setting up the totals in type, and printing same, together with means whereby said type-setting mechanism can be actuated from the keyboard, independently of the adding mechanism.

Figure 1:
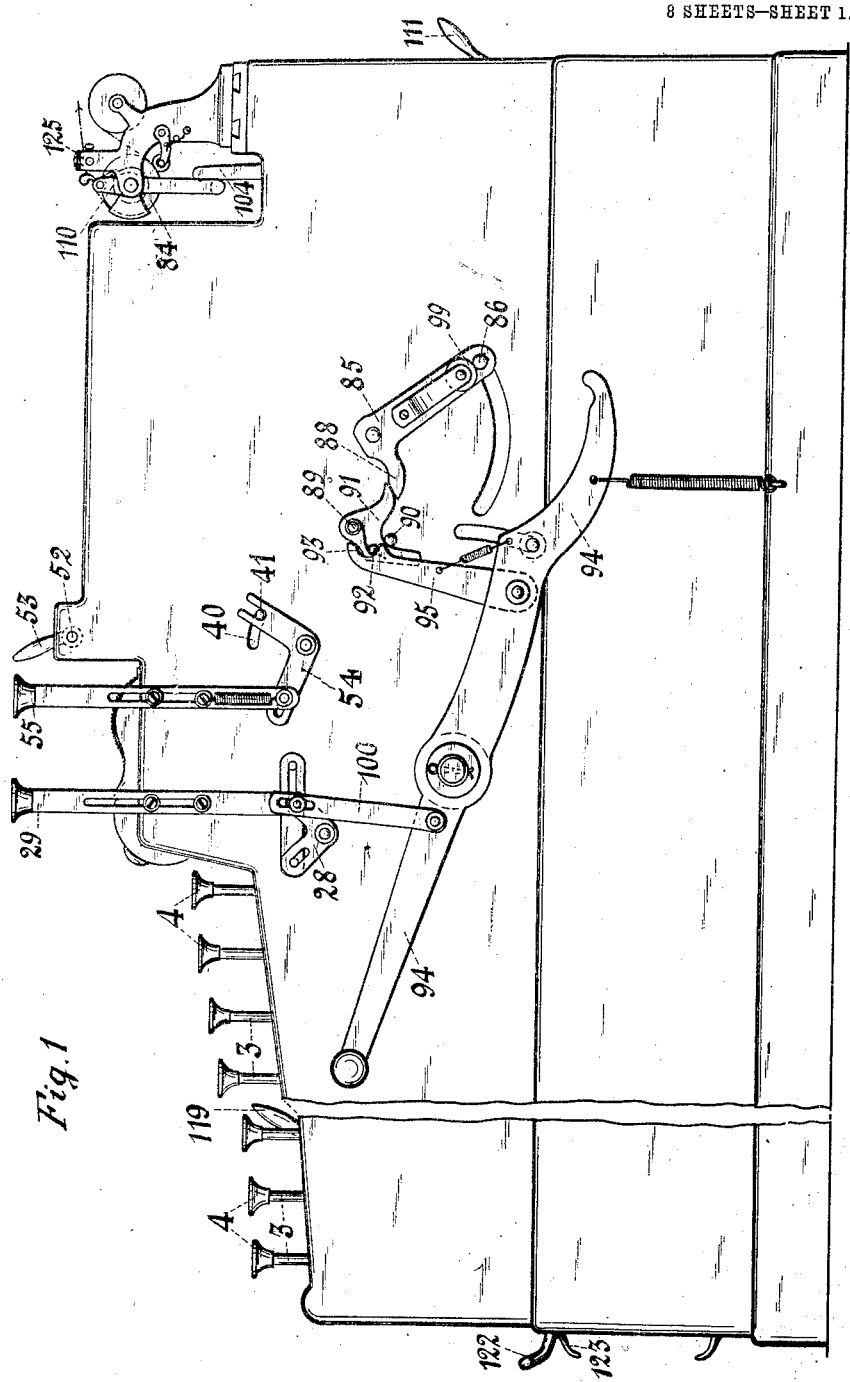
Figure 2:
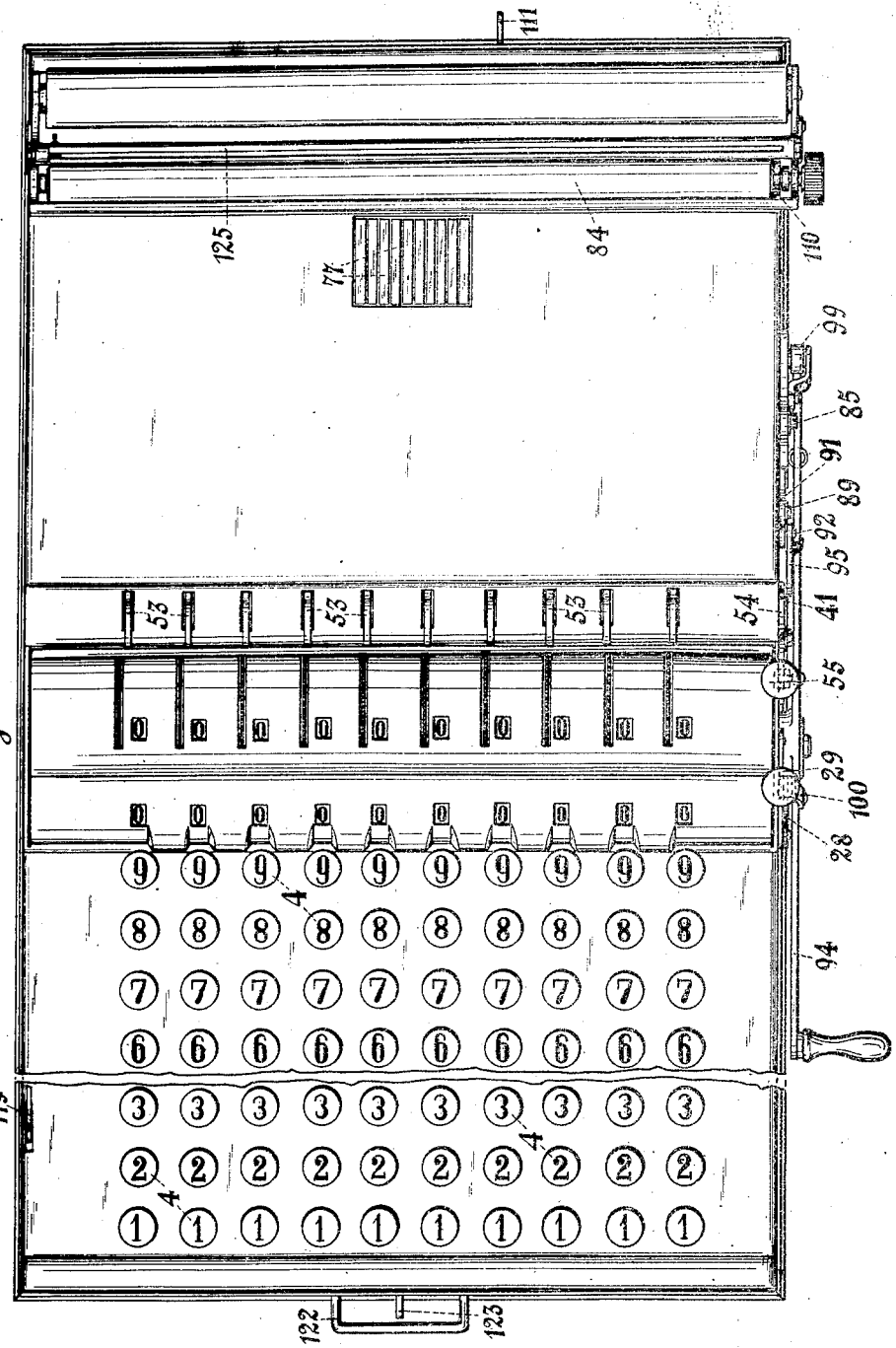
Figure 3:
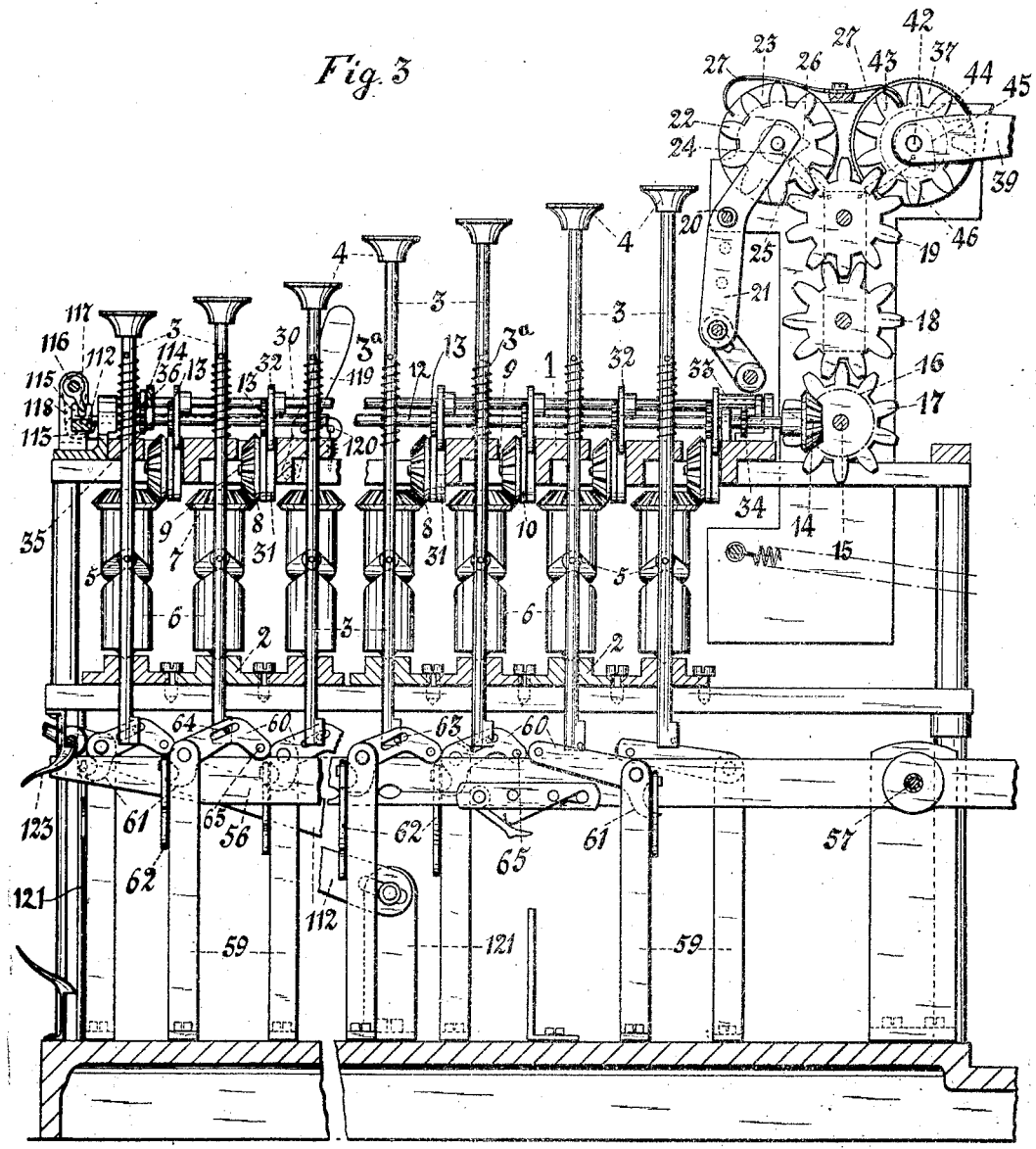

The invention is illustrated in the accompanying drawing, in which,

Figure 1 is a side elevation of the machine with parts broken away, and Fig. 2 a plan view. Fig. 3 is a vertical section of the front part of the machine, drawn to a larger scale and partly broken away. Fig. 4 is a vertical section of the rear part of the machine, drawn to the same scale as Fig. 3. Fig. 5 is a plan view of the mechanism shown in Fig. 3, partly in section and with parts broken away. Fig. 6 is a plan view of the mechanism shown in Fig. 4, partly in section and with parts broken away. Fig. 7 is a side elevation of part of the mechanism for adjusting the types from the keyboard, and Fig. 8 is a plan view thereof, Figs. 9 and 10 being elevations of part of this mechanism, viewed from the left hand side of Figs. 7 and 8, and showing two different positions. Figs. 11 and 11ª are respectively a side elevation and a plan of a detail of the mechanism shown in Figs. 7 to 10. Fig. 12 is a side elevation of part of the adding mechanism. Fig. 13 shows part of the adding mechanism viewed from the front of the machine, Fig. 14 being a side view thereof, and Fig. 15 a plan view. Figs. 16 to 18 show the devices for actuating the adding mechanism from the keyboard, and Figs. 19 to 21ª show details of these devices.

The front part of the machine is horizontally divided by two platforms formed by transverse bars 1, 2 (Fig. 3), each of which has ten equidistant holes forming guides for the shanks 3 of keys 4 supported by springs 3ª. There are nine transverse banks of keys, but in the drawing two of these banks are omitted. Each bank comprises ten keys, and the keys in each vertical row bear the numerals 1 to 9, counting from front to rear. The first row represents the units, the second row the tens, the third row hundreds and so forth. The length of the key shanks are so proportioned that the keys 4 rise in steps toward the rear, enabling the numerals to be conveniently surveyed and the machine to be operated with ease. Each key shank 3 carries a small roller 5, engaging a groove in a rotatable, vertical cam cylinder 6, so that said cylinder is caused to make a complete revolution during the depression and ascent of the key. Each cam cylinder is connected by a ten toothed bevel wheel 7 with a bevel wheel 8 which has the same number of teeth and is loosely mounted on a pin 9 projecting laterally from one of the transverse bars 1, so that said bevel wheel 8 is rotated by the rotation of the cylinder 6. This arrangement is best shown in Figs. 16 to 18. Each bevel wheel 8 is fixed to a toothed disk or mutilated gear wheel 10 having a number of teeth corresponding with the numeral on the key for operating the respective cam cylinder.

Close to each vertical row of keys there is rotatably mounted, above the bars 1, a shaft 12 to which are fixed nine toothed wheels 13; each of the latter has ten teeth and meshes with the teeth on one of the disks 10, so that the latter can severally drive the wheels 13 and rotate the shaft 12 through angles proportionate to the number of teeth on the disks 10. Keyed to the rear end of each shaft 12 there is a bevel wheel 14 (Fig. 3) which meshes with a bevel wheel 16 loosely mounted on a shaft 15; to the bevel wheel 16 is fixed a toothed wheel 17 which can be geared by two similar toothed wheels 18, 19 with a toothed wheel 22 carried by a lever 21 pivoted on a spindle 20. (Fig. 12.) To each toothed wheel 22 there is fixed a disk 23, on the circumference of which are marked equidistant numerals 0 to 9. The disks 23 are normally held in position to exhibit the zero signs by springs 25 engaging pins 24 projecting from cams 26 fixed to said disks 23; the numerals on the latter are visible through apertures provided in the cover plate. Depression of a key 4 causes the respective cylinder 6 to rotate; the latter drives by means of the bevel wheels 7, 8 and disk 10 the shaft 12 belonging to the corresponding row, the rotation of said shaft then being transmitted by the bevel wheels 14, 16 and wheels 17, 18, 19 to the toothed wheel 26 and to the disk 23 thereon, so that this disk is rotated through an angle which causes a numeral corresponding to that on the key to appear in place of the previously exhibited naught. Thus the operator is able to see if he has operated the key bearing the numeral which he had in mind. The rotation of the disk 23 and cam 26 stretches the spring 25 attached to the pin 24. The zeroizing of the disks 23 is effected by means of a spring supported key 29 (Fig. 1) to which the levers 21 are collectively connected by a bellcrank lever 28. By depressing said key 29 the levers 21 are rocked and caused to lift the wheels 22 out of mesh with the wheels 19, whereupon the stretched spring 25 pulls the rotated disk 23 back to zero position. Release of the key 29 allows the levers 21 to return to normal position. If the spring 25 of the rotated disk is in a dead-point position, disabling it from rotating the disk when the wheel 22 is lifted out of mesh, the cam 26 strikes an abutment formed by a curved tooth of a kind of comb 27, and rotation of the disk is thus initiated, enabling the spring to perform its function.

Parallel with each shaft 12 there is another rotatable shaft 30 to which are fixed hooked levers 32 opposite cam disks 31 fixed to the toothed disks 10, Figs. 16, 17, 18. The hooks are held against the cams 31 by means of a torsion spring on the shaft 30. The crests of the cam disks 31 (Figs. 21, 21ª) severally correspond in length with the toothed arcs of the respective disks 10 but are angularly somewhat in advance of said toothed parts. When rotation of a disk 10 takes place the cam 31 causes the lever 32 to be raised. This movement rotates the shaft 30 through a certain angle and causes a pawl 33 at the rear end of said shaft to be disengaged from a ratchet wheel 34 on the adjacent shaft 12, enabling the latter to be rotated by the toothed disk 10 and wheel 13. As soon as the toothed part of the disk 10 has cleared the wheel 13, the point of the hooked lever 32 passes onto the lower path of the cam 31 and the shaft 30 is rotated back, causing the pawl 33 to reëngage the ratchet wheel 34 on the shaft 12. This insures precision by preventing movement of the shaft 12 except when operated by a key. For additional security there is arranged at the front end of each shaft 12 a small ratchet wheel 35 with a pawl 36 which latter prevents the shaft 12 from rotating backward.

Behind the disks 23 there is a row of adding disks 37, (Figs. 13, 14, 15) which are likewise marked with the numerals 9-0. The disks 37 are carried by double-armed levers 39 mounted on a shaft 38. The levers 39 abut with their free hooked ends against a rod 41 which extends through the width of the machine and is mounted in slots 40 in the frame of the machine. The disks 37 are cup-shaped and are loosely mounted on the shaft 42 carried by the levers 39; each of these disks is provided inside with a pawl which engages a small ratchet wheel integral with a pinion 43 meshing with one of the above-mentioned wheels 19. To the shaft 42 there are fixed, for each disk 37 a disk 44, provided with a tooth, and a cam 45 connected to a spring 46 which normally holds the disk 37 in its zero position. Above the rod 41 there is a fixed shaft 47 carrying loosely mounted equidistant pairs of levers 48, 48, the lower ends of each pair forming bearings for a shaft 49. Said shaft 49 carries a pair of toothed wheels 50, 51 connected by a sleeve; the wheel 50 projects into the path of the tooth on the disk 44, and the toothed wheel 51 is meshed with the toothed wheel 43 acting on the next adding disk 37, the gears being so proportioned that at each revolution of one adding disk the next one is moved one unit. By this means the result of an adding operation is exhibited, and the sum may be transferred to paper. In order to enable the figures to be seen, inspection apertures are provided in the cover, over the adding disks.

The adding disks 37 can be thrown out of gear by means of a key 55, (Fig. 1) connected by a fork-shaped bell crank lever 54 to the rod 41. The cams 45 on the disks 37, coacting with the comb 27, perform a function similar to that of the cams 26, when the springs 46 are at a dead center. The levers 48 carrying the transfer wheels 50, 51, have upwardly projecting finger shaped ends, abutting against hand-levers 53 mounted on a spindle 52; the said levers 53 project through slots in the cover plate of the machine. These levers 53 enable the transfer wheels to be disengaged at any section of the series by rocking the levers 48. This device is of great importance. By actuating a lever 53 at the central part of the machine the adding mechanism can be divided into two independent parts, so that for instance "debit" and "credit" can be computed separately. The levers 53 can be also used for subtraction and for rectifying mistakes due to operating wrong keys. For adding the amounts of bills, checks or the like, as many counting disks as is necessary are thrown out of gear. For this purpose the counting disks may be so mounted that each of them may be separately lifted out of engagement with the gear wheels. Likewise, the disengaging rod 41 behind the second register may be divided so that by pushing back one part of it, the counting mechanism belonging thereto is thrown out of gear; the other part remaining in action.

The cover parts over the counting wheels, provided with inspection apertures, may be so arranged that they also take part in the slight movement when the counting mechanism is thrown out of gear.

Underneath each vertical row of key shanks 3 there is a lever 56 pivoted at 57 with a spring 58 tending to elevate its front end. Adjacent to each lever 56 are pillars 59 which are staggered so that they stand alternately at opposite sides of the lever (Figs. 7 and 8). On these pillars are mounted movable arms 60 (Figs. 11, 11ª). Each of the latter has a finger 61 which engages a bell crank 62, the latter being pivoted to the pillar and having an arm projecting under the lever 56. At the central part of arm 60 there is a slot 63 into which projects a pin 64 fixed to the lower end of the adjacent key shank 3, and the arm has at its free end a lateral pin 65 which projects over the lever 56. Hence, if the key is depressed it rotates the arm 60 and the lever 56 is depressed by the pin 65, and the finger 61 actuates the bell crank 62 until the latter strikes the lever 56, and limits its downward movement.

The levers 56 are bent inward behind their pivots 57 in such a manner that the rear ends of the same lie comparatively close together (Fig. 6). At the rear end of each lever 56 there is a lateral pin 66 (Fig. 4) which projects into a slot 67 in a bell crank lever 68. The levers 68 are fulcrumed on a shaft 69 extending through the width of the machine and connected by links 70 to levers 72 pivoted at 71. Each of the levers 72 extends through a casing 73 containing ten parallel plates 74, stepped at top and bottom, capable of vertical movement in said casing. These plates 74 rest with their bases on the floor of the casing 73, and are provided with curved slots 75 for engagement with pins 76 projecting laterally from the levers 72. Resting loosely on the upper edge of each plate 74 are ten spring pressed types 77 capable of horizontal movement, representing in series from top to bottom the numerals 0 to 9. These types can be lifted out of the casing 73 into printing position, by raising the plates 74. The plates 74 are raised by means of the levers 72 actuated by the key-actuated levers 56. The extent of the lifting movement depends on the position of the actuated key relatively to the pivot 57, the parts being so proportioned that each key is adapted to lift into printing position the type representing the value of the key. The plates 74 are racked and engaged by pawls 83, which hold them in lifted position.

Each lever 72 carries at its free end a spring pressed slide 78, which, when the lever is in normal position, serves as abutment for one of a series of ten hammers 80 pivoted at 79. These hammers are adapted to actuate spring pressed pins 82 horizontally movable in guides 81, these pins being arranged opposite the vertical series of types, in position to thrust the types in printing position toward the paper on the intermittently rotating platen 84.

The hammers 80 are actuated by means of a rod 86 carried by arms 85 which are pivoted to the frame of the machine, said rod being connected to springs 87. The arm 85 on the right hand side is provided with a finger 88 (Fig. 1) which bears against one arm of a bell crank 91, the movement of which is limited by a stop 90. A pin 92, on the other arm of this bell crank projects into the mouth 93 of a pawl 95, pivoted to a double armed lever 94. By depressing the front end of the lever 94 the pawl 95 is lifted and caused to rotate the bell crank 91 thus enabling the springs 87 to rock the arms 85 and swing the rod 86 against the hammers 80. At the same time a link 96 pivoted to the rear part of the lever 94 rocks a frame 98 pivoted at 97. This frame 98 swings rearward to serve as an abutment for the hammer levers when the latter fly back from the spring pressed pins 82.

Mounted at the lower part of the right hand arm 85 there is a roller 99, which, when the arm 85 swings forward is placed over the curved rear end of the lever 94, so that during the upward movement of said curved part the latter strikes the roller and restores the arm 85 to its original position in which the said arm is reëngaged with the bell crank 91. Consequently the machine can be operated again immediately after the type has been printed.

The lever 94 is connected by a slotted link 100 with the bell crank lever 28 acting on the levers 21, so that every time the lever 94 is depressed the disks 23 are released, enabling the zeroizing devices to act. At the right hand side of the casing 73 there is a horizontally movable slide 101 (Fig. 6), the forward end of which is held by a spring in the path of the rod 86 and which is struck when the rod 86 moves back. The slide 101 engages, by means of its rear end and a lateral pin 102, the free ends of two vertically depending levers 103 and 104. The lever 103 is pivoted at 105 and carries at its upper end an anchor shaped double pawl 106 which at every movement imparted to it rotates the ratchet wheel 108, acting on the ribbon gear 107; if resistance is offered by the gear, as is the case when the ribbon has been wound off one reel, the said double pawl automatically reverses and works in the opposite direction, so that the ribbon is wound off the full reel onto the empty one.

The lever 104 is pivoted at 109 and acts with its upper end on the paper feed mechanism 110; its lower end carries a rotatory abutment plate 111 provided with three steps, which can be adjusted for regulating the spacing of the lines and for throwing the mechanism 110 out of action. The paper leaving the platen in the direction indicated by the arrow in Fig. 1, passes between a longitudinally slotted hollow cap 124 and a likewise longitudinally slotted bar 125, and it is cut off by a knife guided in the hollow cap, and moved along the longitudinal slots in the cap 124 and bar 125. This knife may be operated by hand or mechanical means.

Mounted at the front of the machine in front of the first bank of keys there is a transverse bar 112 (Figs. 3 and 5) extending through the width of the machine, which abuts against the ends of the shafts 12 and is connected by slidable rods 113 to a bar 114 provided with projections like the teeth of a rake, which project toward the toothed wheels 13 in front of them, on the shafts 12 in position for engaging the same. At each end of the bar 112 there is a cup-shaped projection 115 engaged with a cam 117 fixed to a rotatable shaft 116 so that by rotation of the shaft 116 the bars 112, 114 can be shifted forward and rearward. The shaft 116 is rotated by a link 120, connecting an arm 118 on the shaft to a handle 119; this link can be locked in its end positions by means of notches engaging a fixed tooth. When the bars 112, 114 are moved forward the bar 114 moves all the shafts 12 with it, so that the bevel wheels at the rear ends of said shaft are disengaged from the bevel wheels 16; consequently when the keys are depressed the counting wheels remain stationary but the numerals on the keys are printed on the paper. The bevel wheels 14 are brought into mesh again with the bevel wheels 16 by moving the bars 112, 114 rearward, and by operating the keys and the lever 94, both series of counting wheels and the printing device are caused to work together, the first series of counting wheels being, however, zeroized by each depression of the lever 94.

At the front of the machine on the base of the same, there is mounted on a pillar 121 a lever 122 having its front end bent transversely across the levers 56, the lever 122 being normally held up by a spring 123. By depressing the lever 122 all the levers 56 are depressed sufficiently to prevent the actuation thereof by the levers 60, so that the printing mechanism is put out of action, the counting mechanism remaining, however, in gear.

What I claim as my invention and desire to secure by Letters Patent of the United States is:—

1. In an adding machine the combination of a series of numeral keys, a rotatable counting disk bearing numerals corresponding to the numerals of the keys, a driving shaft, driving gear connecting said shaft to said disk, a series of gear wheels fixed to said shaft, a series of mutilated gear wheels adapted to severally coact with the gear wheels on the shaft, the gearing segments of said mutilated wheels being severally proportionate to the numerals of the keys, and means enabling each key to impart, during each actuation, a complete revolution to one of the mutilated gear wheels.

2. In an adding machine the combination of a series of numeral keys, a rotatable counting disk bearing numerals corresponding to the numerals of the keys, a driving shaft, driving gear connecting said shaft to said disk, a series of gear wheels fixed to said shaft, a series of mutilated gear wheels adapted to severally coact with the gear wheels on the shaft, the gearing segments of said mutilated wheels being severally proportionate to the numerals of the keys, a series of rotatable cylinders having cam grooves, rollers carried by the keys and engaged with said cam grooves so that the depression and ascent of each key causes one of the cylinders to make a complete revolution, and means connecting said cam cylinders to said mutilated gear wheels so that the latter make complete revolutions with the cam cylinders.

3. In an adding machine the combination of a series of numeral keys, a rotating counting disk bearing numerals corresponding to the numerals of the keys, a driving shaft, driving gear connecting said shaft to said disk, a series of gear wheels fixed to said shaft, a series of mutilated gear wheels adapted to severally coact with the gear wheels on the shaft, the gearing segments of said mutilated wheels being severally proportionate to the numerals of the keys, means enabling each key to impart during each actuation, a complete revolution to one of the mutilated gear wheels, a spring actuated rock shaft parallel with the driving shaft, means whereby said rock shaft, in normal position, locks the driving shaft, cams fixed to said mutilated gear wheels, and levers fixed to said rock shaft and resting on said cams so that the latter rock the rock shaft and disable the said locking means before the mutilated gear wheels engage the gear wheels fixed to the driving shaft.

4. In an adding machine the combination of a series of numeral keys, a counting disk bearing numerals corresponding to the numerals of the keys, a driving shaft, a toothed driving gear train connecting said shaft to said counting disk, a series of gear wheels fixed to said shaft, a series of mutilated gear wheels adapted to severally coact with the gear wheels on the shaft, the gear segments of said mutilated wheels being severally proportionate to the numerals of the keys, means enabling each key, during one actuation, to impart a complete revolution to the coacting mutilated gear wheel, a spring tending to hold the disk in zero position, a zeroizing key, and means enabling said zeroizing key to uncouple the disk from the driving shaft, so that the spring can zeroize the disk.

5. In an adding machine the combination of a series of numeral keys, a counting disk bearing numerals corresponding to the numerals of the keys, a driving shaft, a toothed driving gear train connecting said shaft to said counting disk, a series of gear wheels fixed to said shaft, a series of mutilated gear wheels adapted to severally coact with the gear wheels on the shaft, the gear segments of said mutilated wheels being severally proportionate to the numerals of the keys, means enabling each key, during one actuation, to impart a complete revolution to the coacting mutilated gear wheel, a spring tending to hold the disk in zero position, a zeroizing key, and means enabling said zeroizing key to lift one member of the driving gear train out of mesh, enabling the spring to zeroize the disk.

6. In an adding machine the combination of a series of numeral keys, a counting disk bearing numerals corresponding to the numerals of the keys, a driving shaft, a toothed driving gear train connecting said shaft to said counting disk, one member of said gear train being fixed to said disk, a series of gear wheels fixed to said shaft, a series of mutilated gear wheels adapted to severally coact with the gear wheels fixed to the shaft, the gear segments of said mutilated wheels being severally proportionate to the numerals of the keys, means enabling each key, during one actuation, to impart a complete revolution to the coacting mutilated gear wheel, a cam fixed to said disk, a spring eccentrically attached to said cam and tending to hold said disk in zero position, a zeroizing key, means enabling said zeroizing key to move the disk and the toothed gear member fixed thereto, so that the latter is taken out of mesh and allows the spring to zeroize the disk, and an abutment positioned to strike and rotate the cam when the disk is so moved, if the cam is in the position at which the spring is dead centered.

7. In an adding machine the combination of a series of rotatable counting disks, transfer mechanism serially connecting said counting disks, a key board comprising series of numeral keys, one series for each counting disk, a series of driving shafts, one for each series of numeral keys, driving gears connecting said shafts to said disks, gear wheels fixed to said shafts, series of mutilated gear wheels adapted to coact with the gear wheels fixed to said shafts, the gear segments of the mutilated wheels in each series being severally proportionate to the numerals of the key series, means enabling each key, during one actuation, to impart a complete revolution to one of the mutilated gear wheels, a second series of rotatable disks bearing numerals, and means gearing said numeral disks to said counting disks so that the former are rotated to display the numerals corresponding to the numerals of the actuated keys.

8. In an adding machine the combination of a series of rotatable counting disks, transfer mechanism serially connecting said counting disks, a key board comprising series of numeral keys, one series for each counting disk, a series of driving shafts, one for each series of numeral keys, driving gears connecting said shafts to said disks, gear wheels fixed to said shafts, series of mutilated gear wheels adapted to coact with the gear wheels fixed to said shafts, the gear segments of the mutilated wheels in each series being severally proportionate to the numerals of the key series, means enabling each key, during one actuation, to impart a complete revolution to one of the mutilated gear wheels, and means for disengaging the transfer mechanism at any unit in the series of counting disks so that said series of counting disks can be divided into sections which can be independently operated.

9. In an adding machine the combination of a series of rotatable counting disks, transfer devices serially connecting said counting disks, each of said transfer devices comprising two toothed wheels which are mounted upon a spindle and are severally geared to two successive counting disks, devices enabling said spindles to be severally displaced so as to unmesh the toothed wheels which they carry, a key board comprising series of numeral keys, one series for each counting disk, a series of driving shafts, one for each series of numeral keys, driving gears connecting said shafts to said disks, gear wheels fixed to said shafts, series of mutilated gear wheels adapted to coact with the gear wheels fixed to said shafts, the gear segments of the mutilated wheels in each series being severally proportionate to the numerals of the key series, and means enabling each key, during one actuation, to impart a complete revolution to one of the mutilated gear wheels.

10. In an adding machine the combination of a series of numeral keys, a rotatable counting disk bearing numerals corresponding to the numerals of the keys, a driving shaft, driving gear connecting said shaft to said disk, a series of gear wheels fixed to said shaft, a series of mutilated gear wheels adapted to severally coact with the gear wheels on the shaft, the gearing segments of said mutilated wheels being severally proportionate to the numerals of the keys, means enabling each key to impart, during each actuation, a complete revolution to one of the mutilated gear wheels, a movable series of numeral printing types, corresponding to the numerals of the keys, a type-setting lever parallel with the series of keys, and means enabling said keys to engage said lever at varying distances from the lever fulcrum so that the keys, when depressed, severally impart to the lever movement proportionate to their numerals.

11. In an adding machine the combination of a series of numeral keys, a rotatable counting disk bearing numerals corresponding to the numerals of the keys, a driving shaft, driving gear connecting said shaft to said disk, a series of gear wheels fixed to said shaft, a series of mutilated gear wheels adapted to severally coact with the gear wheels on the shaft, the gearing segments of said mutilated wheels being severally proportionate to the numerals of the keys, means enabling each key to impart, during each actuation, a complete revolution to one of the mutilated gear wheels, a movable series of numeral printing types, corresponding to the numerals of the keys, a type-setting lever parallel with the series of keys, means enabling said keys to engage said lever at varying distances from the lever fulcrum so that the keys, when depressed, severally impart to the lever movement proportionate to their numerals, and means whereby the keys check further movement of the lever when they have completed their downward movement.

12. In an adding machine the combination of a series of numeral keys, a rotatable counting disk bearing numerals corresponding to the numerals of the keys, a driving shaft, driving gear connecting said shaft to said disk, a series of gear wheels fixed to said shaft, a series of mutilated gear wheels adapted to severally coact with the gear wheels on the shaft, the gearing segments of said mutilated wheels being severally proportionate to the numerals of the keys, means enabling each key to impart, during each actuation, a complete revolution to one of the mutilated gear wheels, a movable series of numeral printing types, corresponding to the numerals of the keys, a type-setting lever parallel with the series of keys, a series of pivoted arms having projections projecting over said type-setting lever at varying distances from the lever fulcrum, means enabling the keys to severally depress said arms and thereby impart to the lever movements proportionate to the key values, and bell-cranks coacting with said arms so that said bell-cranks and arms interlock with said type-setting lever when the keys have completed their downward movement.

13. In an adding machine the combination of a series of numeral keys, a rotatable counting disk bearing numerals corresponding to the numerals of the keys, a driving shaft, driving gear connecting said shaft to said disk, a series of gear wheels fixed to said shaft, a series of mutilated gear wheels adapted to severally coact with the gear wheels on the shaft, the gearing segments of said mutilated wheels being severally proportionate to the numerals of the keys, means enabling each key to impart, during each actuation, a complete revolution to one of the mutilated gear wheels, a movable series of numeral printing types, corresponding to the numerals of the keys, a type-setting lever parallel with the series of keys, means enabling said keys to engage said lever at varying distances from the lever fulcrum so that the keys, when depressed, severally impart to the lever movement proportionate to their numerals, a type-hammer, a spring actuated hammer actuating device, an automatic catch adapted to restrain said hammer actuating device, and a manually controlled lever adapted to disable said catch and then restore the released hammer actuating device to engagement with said catch.

14. In an adding machine the combination of a series of numeral keys, a rotatable counting disk bearing numerals corresponding to the numerals of the keys, a driving shaft, driving gear connecting said shaft to said disk, a series of gear wheels fixed to said shaft, a series of mutilated gear wheels adapted to severally coact with the gear wheels on the shaft, the gearing segments of said mutilated wheels being severally proportionate to the numerals of the keys, means enabling each key to impart, during each actuation, a complete revolution to one of the mutilated gear wheels, a movable series of numeral printing types, corresponding to the numerals of the keys, a type-setting lever parallel with the series of keys, means enabling said keys to engage said lever at varying distances from the lever fulcrum so that the keys, when depressed, severally impart to the lever movement proportionate to their numerals, a type-hammer, a spring actuated rod adapted to actuate said hammer, an automatic catch adapted to restrain said rod, a roller connected to said rod and a manually controlled lever adapted to disable said catch and having a cam-way which engages said roller after the actuation of the hammer, and restores the rod to engagement with the catch.

15. In an adding machine the combination of a series of numeral keys, a rotatable counting disk bearing numerals corresponding to the numerals of the keys, a driving shaft, driving gear connecting said shaft to said disk, a series of gear wheels fixed to said shaft, a series of mutilated gear wheels adapted to severally coact with the gear wheels on the shaft, the gearing segments of said mutilated wheels being severally proportionate to the numerals of the keys, means enabling each key to impart, during each actuation, a complete revolution to one of the mutilated gear wheels, a movable series of numeral printing types, corresponding to the numerals of the keys, a type-setting lever parallel with the series of keys, means enabling said keys to engage said lever at varying distances from the lever fulcrum so that the keys, when depressed, severally impart to the lever movement proportionate to their numerals, a type-hammer, a spring actuated hammer actuating device, an automatic catch adapted to restrain said hammer actuating device, and a manually controlled lever adapted to disable said catch and then restore the released hammer actuating device to engagement with said catch, ink-ribbon mechanism, line-spacing mechanism for a sheet of paper, and means actuated by the return movement of the hammer actuating device, for actuating said ink ribbon mechanism and line spacing mechanism.

16. In an adding machine the combination of a series of numeral keys, a rotatable counting disk bearing numerals corresponding to the numerals of the keys, a driving shaft, driving gear connecting said shaft to said disk, a series of gear wheels fixed to said shaft, a series of mutilated gear wheels adapted to severally coact with the gear wheels on the shaft, the gearing segments of said mutilated wheels being severally proportionate to the numerals of the keys, means enabling each key to impart, during each actuation, a complete revolution to one of the mutilated gear wheels, a movable series of numeral printing types, corresponding to the numerals of the keys, a type-setting lever parallel with the series of keys, means enabling said keys to engage said lever at varying distances from the lever fulcrum so that the keys, when depressed, severally impart to the lever movement proportionate to their numerals, and means enabling said type-setting lever to be held out of reach of engagement with the keys.

17. In an adding machine the combination of a series of numeral keys, a rotatable counting disk bearing numerals corresponding to the numerals of the keys, a driving shaft, driving gear connecting said shaft to said disk, means for uncoupling said driving gear, a series of gear wheels fixed to said shaft, a series of mutilated gear wheels adapted to severally coact with the gear wheels on the shaft, the gearing segments of said mutilated wheels being severally proportionate to the numerals of the keys, means enabling each key to impart, during each actuation, a complete revolution to one of the mutilated gear wheels, a movable series of numeral printing types, corresponding to the numerals of the keys, a type-setting lever parallel with the series of keys, and means enabling said keys to engage said lever at varying distances from the lever fulcrum so that the keys, when depressed, severally impart to the lever movement proportionate to their numerals.

In witness whereof I have signed this specification in the presence of two witnesses.

GEORGE KOENIG.

Witnesses:
MORITZ SPREER,
RUDOLPH FRICKE.